(12) United States Patent
Lee et al.

(10) Patent No.: US 9,640,834 B2
(45) Date of Patent: May 2, 2017

(54) LITHIUM BATTERY AND METHOD OF MANUFACTURING THE SAME

(71) Applicant: ELECTRONICS AND TELECOMMUNICATIONS RESEARCH INSTITUTE, Daejeon (KR)

(72) Inventors: Young-Gi Lee, Daejeon (KR); Kwang Man Kim, Daejeon (KR); Kunyoung Kang, Daejeon (KR); Dong Ok Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 14/802,355

(22) Filed: Jul. 17, 2015

(65) Prior Publication Data

US 2016/0028049 A1   Jan. 28, 2016

(30) Foreign Application Priority Data

Jul. 28, 2014 (KR) .................. 10-2014-0095518
Apr. 28, 2015 (KR) .................. 10-2015-0059972

(51) Int. Cl.
*H01M 2/24* (2006.01)
*H01M 10/052* (2010.01)
(Continued)

(52) U.S. Cl.
CPC ....... *H01M 10/052* (2013.01); *H01M 2/0212* (2013.01); *H01M 2/24* (2013.01);
(Continued)

(58) Field of Classification Search
CPC .......... H01M 10/052; H01M 10/0565; H01M 10/0585; H01M 2220/30; H01M 2/0212; H01M 2/24
See application file for complete search history.

(56) References Cited

U.S. PATENT DOCUMENTS

2013/0065104 A1* 3/2013 Faust ................... H01M 4/14
429/144
2014/0008006 A1   1/2014 Lee et al.
(Continued)

FOREIGN PATENT DOCUMENTS

KR  10-2013-0137848 A  12/2013
KR  10-2014-0024464 A   2/2014

OTHER PUBLICATIONS

V. Livshits, et al., "Development of a bipolar Li/composite polymer electrolyte/ Pyrite battery for electric vehicles", Journal of Power Sources, vol. 97-98, pp. 782-785, Jul. 2001.
(Continued)

*Primary Examiner* — Patrick Ryan
*Assistant Examiner* — Ben Lewis
(74) *Attorney, Agent, or Firm* — Rabin & Berdo, P.C.

(57) ABSTRACT

Provided is a lithium battery including a first pouch film, a first anode part on the first pouch film, a second cathode part on the first anode part, a polymer insulating film on the second cathode part, the polymer insulating film including a disk which is configured to penetrate the polymer insulating film, a second anode part on the polymer insulating film, a first cathode part on the second anode part, and a second pouch film on the first cathode part. Herein, the second cathode part is electrically connected to the second anode part through the disk.

19 Claims, 8 Drawing Sheets

(51) Int. Cl.
 *H01M 2/02* (2006.01)
 *H01M 10/0565* (2010.01)
 *H01M 10/0585* (2010.01)

(52) U.S. Cl.
 CPC ... *H01M 10/0565* (2013.01); *H01M 10/0585* (2013.01); *H01M 2220/30* (2013.01); *Y02P 70/54* (2015.11)

(56) References Cited

U.S. PATENT DOCUMENTS

2014/0079992 A1  3/2014  Tanaka
2014/0147746 A1  5/2014  Tanaka
2015/0125731 A1  5/2015  Ro et al.

OTHER PUBLICATIONS

Joo-Seong Kim, et al., "Large area multi-stacked lithium-ion batteries for flexible and rollable applications" Journal of Materials Chemistry A, vol. DOI: 10.1039/c4ta00551a, Apr. 17, 2014.

* cited by examiner

LITHIUM BATTERY AND METHOD OF MANUFACTURING THE SAME

CROSS-REFERENCE TO RELATED APPLICATIONS

This U.S. non-provisional patent application claims priority under 35 U.S.C. §119 of Korean Patent Application Nos. 10-2014-0095518, filed on Jul. 28, 2014, and 10-2015-0059972, filed on Apr. 28, 2015, the entire contents of which are hereby incorporated by reference.

BACKGROUND

The present disclosure herein relates to a lithium battery, and more particularly, to a lithium battery which is connected in series.

As technologies related to energy storage and energy conversion have become more important, interest in lithium secondary batteries has increased significantly. Lithium batteries may include cathodes, separators, anodes, and electrolytes. The electrolytes are made of lithium salts and solvents which are able to dissociate the lithium salts, and serve as media that facilitate a movement of ions between the cathodes and the anodes. Lithium batteries have a very high energy density compared to other batteries and can be manufactured to be small and light. Thus, lithium batteries are being actively developed to be used as a power source for mobile electronics devices. Recently, as the performance of mobile electronics devices has improved, power consumed in the mobile electronics devices has increased. There is a need for lithium batteries with high power and satisfactory discharge characteristics. Moreover, there is a need for methods that employ automation, continuous processing and mass production to manufacture lithium batteries.

SUMMARY

The present disclosure provides a lithium battery having a high voltage and a method of manufacturing the same.

The present disclosure also provides a method of easily manufacturing a lithium battery which is connected in series.

The present disclosure also provides a method of manufacturing a lithium battery which has an improved performance and may have a large area.

An embodiment of the inventive concept provides a lithium battery including: a first pouch film; a first anode part on the first pouch film; a second cathode part on the first anode part; a polymer insulating film on the second cathode part, the polymer insulating film including a disk which is configured to penetrate the polymer insulating film; a second anode part on the polymer insulating film; a first cathode part on the second anode part; and a second pouch film on the first cathode part; wherein the second cathode part is electrically connected to the second anode part through the disk.

In an embodiment, the polymer insulating film may include a first surface and a second surface opposite to the first surface, the first surface facing the first pouch film; the first anode part may include a first anode current collector, a first anode layer, and a first anode electrolyte layer which are laminated on the first pouch film; the second cathode part may include a second cathode current collector, a second cathode layer, and a second cathode electrolyte layer which are laminated on the first surface of the polymer insulating film; the second anode part may include a second anode current collector, a second anode layer, and a second anode electrolyte layer which are laminated on the second surface of the polymer insulating film; and the first cathode part may include a first cathode current collector, a first cathode layer, and a first cathode electrolyte layer which are laminated on the second pouch film.

In an embodiment, the first anode electrolyte layer may face and contact the second cathode electrolyte layer; and the second anode electrolyte layer may face and contact the first cathode electrolyte layer.

In an embodiment, the first anode electrolyte layer may include the same material as the first cathode electrolyte layer, the second anode electrolyte layer and the second cathode electrolyte layer.

In an embodiment, the polymer insulating film may include a third surface configured to connect the first surface to the second surface; and the third surface of the polymer film may be exposed by the second cathode electrolyte layer and the second anode electrolyte layer.

In an embodiment, each of the second cathode part, the second anode part and the polymer insulating film may be provided in plurality, in which the second cathode electrolyte layer of each of the second cathode parts may face and contact the second anode electrolyte layer of each of the second anode parts that are adjacent to the second cathode parts.

In an embodiment, the first anode part and the second cathode part may form a first unit cell, and the second anode part and the first cathode part may form a second unit cell, the first unit cell may be connected to the second unit cell in series through the disk.

In an embodiment, the first unit cell may have the same voltage and capacity as the second unit cell.

In an embodiment, each of the second cathode part, the second anode part and the polymer insulating film may be provided in plurality, number of the second cathode parts may be equal to number of the second anode parts and number of the polymer insulating films; and each of the polymer insulating films may be disposed between one of the second cathode parts and one of the second anode parts.

In an embodiment, an anode terminal may be connected, on the first pouch film, to the first anode current collector, and configured to protrude laterally and horizontally from the first anode current collector; and a cathode terminal may be connected, on the second pouch film, to the first cathode current collector, and configured to protrude laterally and horizontally from the first cathode current collector.

An embodiment of the inventive concept provides a method of manufacturing a lithium battery including: forming a first anode part on a first pouch film, the first anode part including a first anode current collector, a first anode layer and a first anode electrolyte layer which are laminated sequentially on the first pouch film; forming a first cathode part on a second pouch film, the first cathode part including a first cathode current collector, a first cathode layer and a first cathode electrolyte layer which are laminated on the second pouch film; providing a bipolar part, the bipolar part including a polymer insulating film, one or more disks configured to penetrate the polymer insulating film, a second cathode part on a first surface of the polymer insulating film, and a second anode part on a second surface of the polymer insulating film; and connecting the first cathode part and the first anode part by providing the bipolar part therebetween; wherein the first cathode part contacts the second anode part, and the first anode part contacts the second cathode part.

In an embodiment, the second cathode part may be connected to the second anode part in series through the disk.

In an embodiment, the providing of the bipolar part may include: forming the second cathode part by laminating, on the first surface of the polymer insulating film, a second cathode current collector, a second cathode layer, and a second cathode electrolyte layer; and forming the second anode part by laminating, on the second surface of the polymer insulating film, a second anode current collector, a second anode layer, and a second anode electrolyte layer.

In an embodiment, the second cathode current collector and the second anode current collector may be connected to the disk through ultrasonic bonding.

In an embodiment, the connecting of the first cathode part, the second anode part, and the bipolar part may include thermally bonding the first cathode part, the second anode part, and the bipolar part at a temperature in the range of about 100° C. to about 160° C.

In an embodiment, the polymer insulating film may have a third surface configured to connect the first surface to the second surface, and the third surface may be exposed by the second cathode electrolyte layer and the second anode electrolyte layer.

In an embodiment, the first anode electrolyte layer may face and contact the second cathode electrolyte layer, and the second anode electrolyte layer may face and contact the first cathode electrolyte layer.

In an embodiment, the first anode electrolyte layer, the first cathode electrolyte layer, the second anode electrolyte layer, and the second cathode electrolyte layer may include the same material.

In an embodiment, the bipolar part may be provided in plurality, and the second cathode electrolyte layer of one of the bipolar parts may contact the second anode electrolyte layer of another of the bipolar parts that is adjacent to the one of the bipolar parts.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Terms used herein are merely provided for illustration of specific embodiments, and not limited to the inventive concept. A singular form, unless otherwise indicated, includes a plural form. The term "comprises" and/or "comprising" intends to mean that there may be specified elements, steps, operations, devices, or combinations thereof, not excluding the possibility of the presence or addition of the specified elements, steps, operations, devices, or combinations thereof.

Additionally, embodiments described herein will be described with reference to cross-sectional views and/or plan views as ideal exemplary views of the embodiments of the inventive concept. In the drawings, the dimensions of layers and regions are exaggerated for clarity of illustration. Accordingly, shapes of the exemplary views may be modified according to manufacturing techniques and/or allowable errors. Therefore, the embodiments of the inventive concept are not limited to the specific shape illustrated in the exemplary views, but may include other shapes that may be modified according to manufacturing processes. For example, an etched region illustrated as a rectangle may have rounded or curved features. Therefore, areas exemplified in the drawings have general properties, and are used to illustrate a specific shape of a device. Thus, this should not be construed as limited to the scope of the inventive concept.

Hereinafter, a lithium battery and a method of manufacturing the same according to an embodiment of the inventive concept will be described in detail with reference to the accompanying drawings.

Figure 1A:
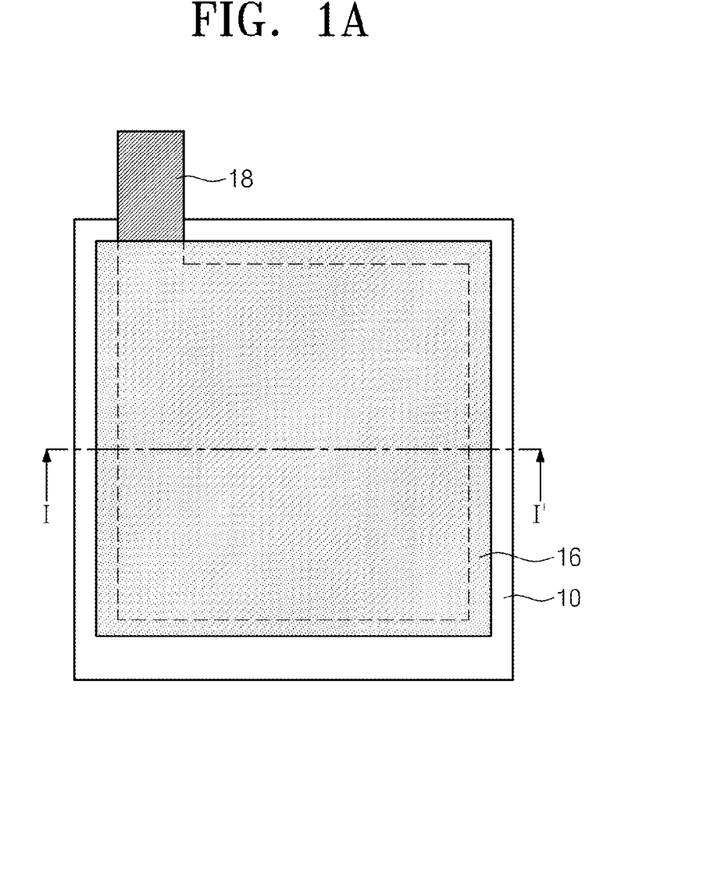
FIGS. 1A, 2A, and 4A are plan views illustrating a method of manufacturing a lithium battery according to an embodiment of the inventive concept.
Figure 1B:
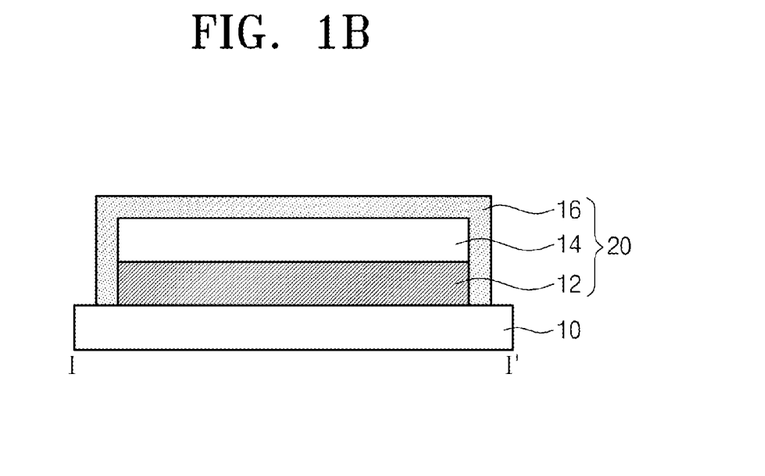
FIGS. 1B, 2B, and 4B are cross-sectional views taken along lines I-I', II-II', and III-III' of FIGS. 1A, 2A, and 4A, respectively.
Figure 2A:
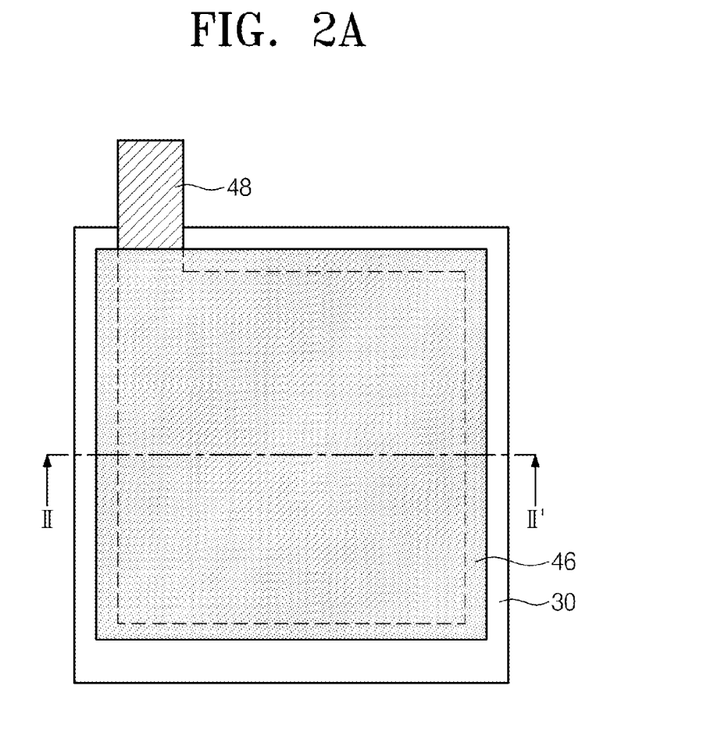
Figure 2B:
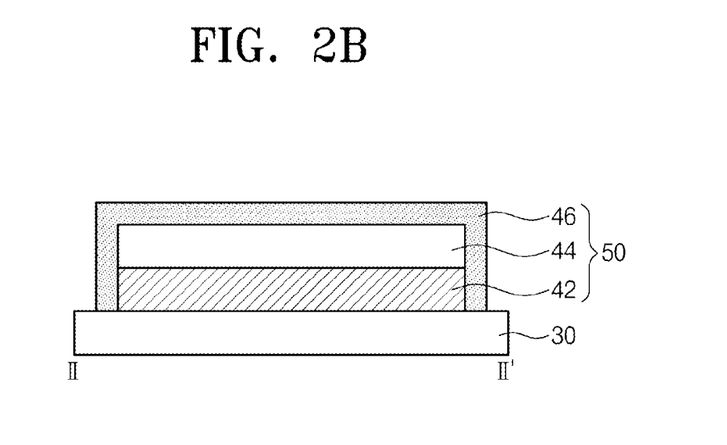
Figure 3:
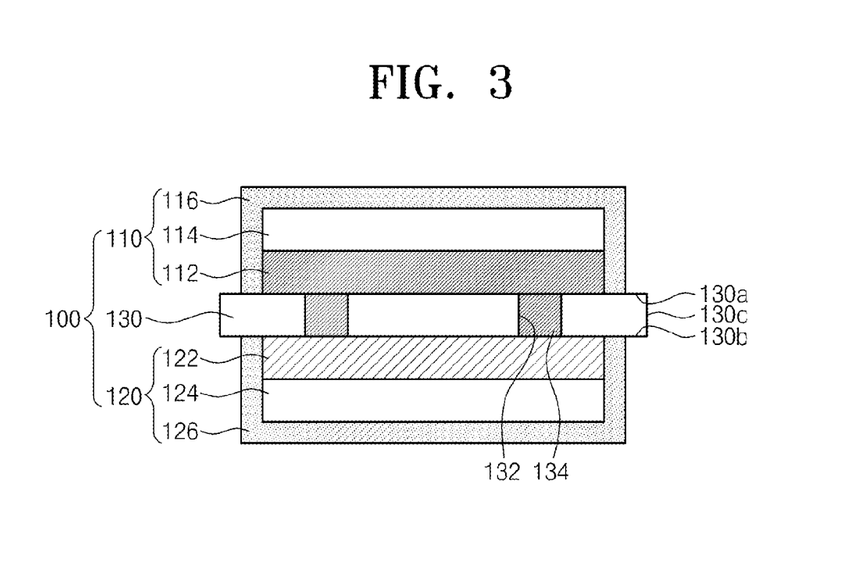
FIG. 3 is a cross-sectional view illustrating a bipolar part according to an embodiment of the inventive concept.
Figure 4A:
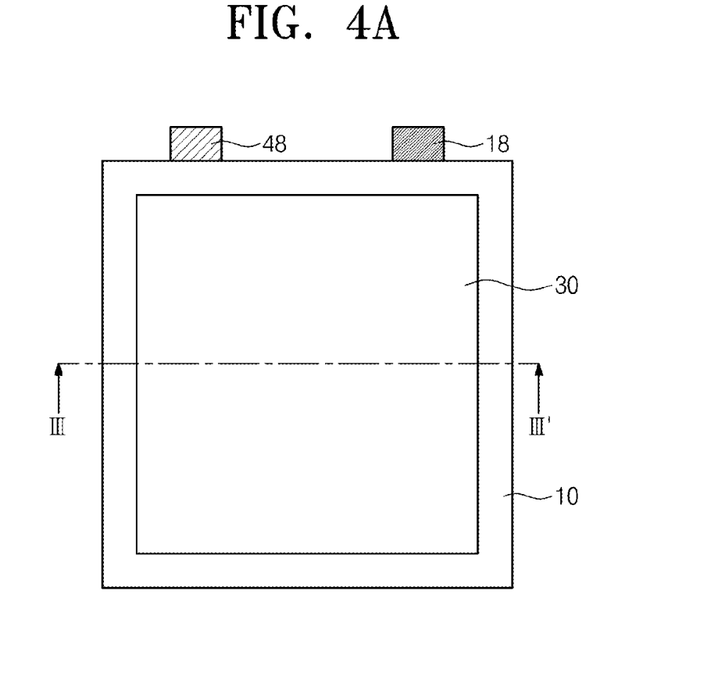
Figure 4B:
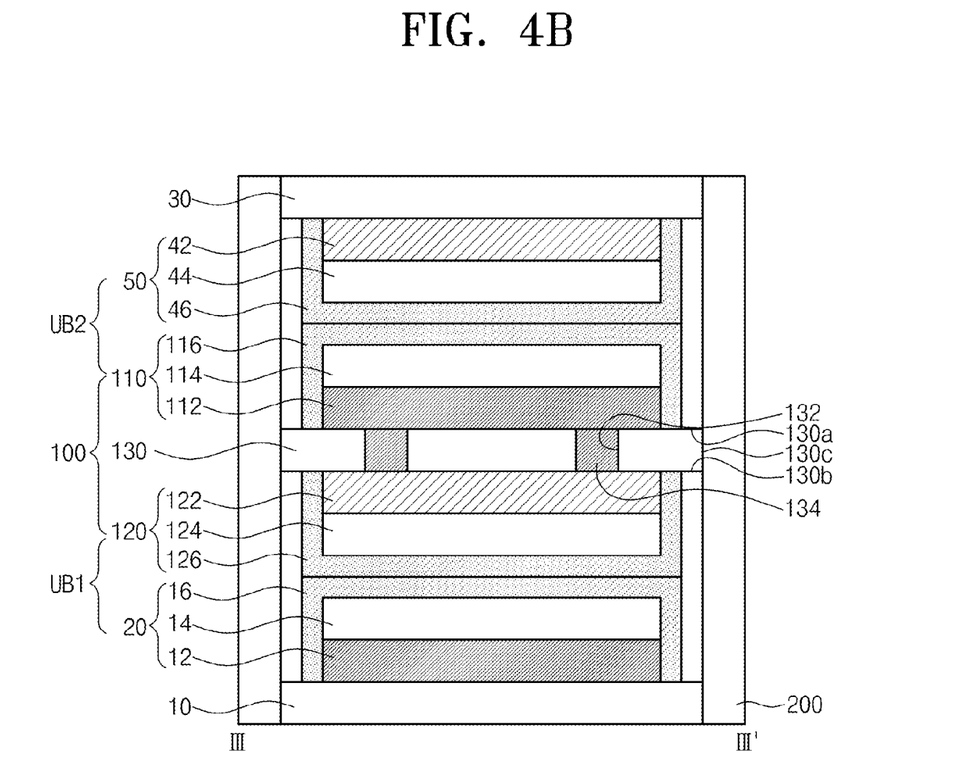

FIGS. 1A, 2A, and 4A are plan views illustrating a method of manufacturing a lithium battery according to an embodiment of the inventive concept. FIGS. 1B, 2B, and 4B are cross-sectional views taken along lines I-I', II-II', and III-III' of FIGS. 1A, 2A, and 4A, respectively. FIG. 3 is a cross-sectional view illustrating a bipolar part according to an embodiment of the inventive concept.

Referring to FIGS. 1A and 1B, a first anode part 20 may be formed on a first pouch film 10. The first pouch film 10 may include an insulating film, a first resin film such as a polypropylene film on one surface of the insulating film, and a second resin film such as a nylon film on the other surface of the insulating film. The first pouch film 10 may include a metal layer such as an aluminum layer, a polymer composite layer, and combinations thereof; and may have a multilayered structure. A top surface of the first pouch film 10 may be subjected to surface treatment. For example, the surface treatment may include applying plasma to the top surface of the first pouch film 10 in an atmospheric condition. The plasma treatment may cause a functional group such as a radical to be formed on the top surface of the first pouch film 10, so that the surface energy of the top surface may increase. The first anode part 20 may include a first anode current collector 12, a first anode layer 14, and a first anode electrolyte layer 16.

The first anode current collector 12 and an anode terminal 18 may be formed on the first pouch film 10. For example, a metal foil may be attached to the top surface of the first pouch film 10 to form the first anode current collector 12. The metal foil may be attached using a lamination process. For another example, the first anode current collector 12 may be formed using a deposition process such as sputtering. The top surface of the first pouch film 10 having a high surface energy may allow the first anode current collector 12 to be attached well to the first pouch film 10. The first anode current collector 12 may have a smaller area than the first pouch film 10. The first anode current collector 12 may be formed to have a thickness of about 2 μm to about 20 μm. The anode terminal 18 may contact, on the pouch film 10, the first anode current collector 12, and protrude from the first anode current collector 12. The anode terminal 18 and the first anode current collector 12 may be formed simultaneously. Accordingly, a separate process for forming the anode terminal 18 may be omitted. The first anode current collector 12 and the anode terminal 18 may include a metal such as copper, nickel, stainless steel (for instance, steel use stainless (SUS)), titanium, or an alloy thereof. The first anode current collector 12 and the anode terminal 18 may be a solid.

The first anode layer 14 may be formed on the first anode current collector 12. The first anode layer 14 may be formed to have an area equal to or smaller than the first anode current collector 12. The first anode layer 14 may have a thickness of about 15 μm to about 150 μm. For example, the first anode layer 14 may be formed by screen printing an anode paste on the first anode current collector 12. The anode paste may be prepared by mixing an anode active material, a conductive agent, and an electrolyte paste at a weight ratio of about 6:2:2 to about 9.8:0.1:0.1. The anode active material may include a carbonaceous material (such as graphite, hard carbon, soft carbon, or tin) or a non-carbonaceous material (such as tin, silicon, lithium titanium oxide ($Li_xTiO_2$) nanotube, or spinel lithium titanium oxide ($Li_4Ti_5O_{12}$) which is coated with carbon particles). The conducting agent may include at least one of graphite, hard carbon, soft carbon, carbon fiber, carbon nanotube, carbon black, acetylene black, ketjen black, or Lonza carbon. The electrolyte paste will be discussed below. The first anode layer 14 may be formed by performing drying and roll pressing processes following the screen printing process.

The first anode layer 14 may be a solid.

The first anode electrolyte layer 16 may be formed by screen printing electrolyte paste on the first anode layer 14. After the screen printing, the first anode electrolyte layer 16 may be dried. The first anode electrolyte layer 16 may be formed to cover the first anode current collector 12 and the first anode layer 14. For example, the first anode electrolyte layer 16 may contact a top surface and a side surface of the first anode layer 14, and a side surface of the first anode current collector 12. Referring to FIG. 1A, the first anode electrolyte layer 16 may not shield the anode terminal 18, that is, the anode terminal 18 may be disposed not to be covered by the first anode electrolyte layer 16. The first anode electrolyte layer 16 may have a thickness of about 5 μm to about 150 μm. The first anode electrolyte layer 16 may be a solid.

Electrolyte paste may be produced by mixing a cellulose-based polymer and a polyvinylidene fluoride-based polymer to form a mixture, then dissolving the mixture in a solvent to produce a solution, and subsequently adding a non-aqueous electrolyte solution and an inorganic material to the solution. The cellulose-based polymer and the polyvinylidene fluoride-based polymer may be mixed at a weight ratio of about 1:99 to about 99:1. The cellulose-based polymer may have a strong adhesive property and include cellulose, ethyl cellulose, butyl cellulose, carboxyl methyl cellulose, or hydroxypropyl cellulose. The polyvinylidene fluoride-based polymer may have a film formation characteristic, and include polyvinyl chloride derivatives, acrylonitrile-based polymer derivatives, polyvinylidene fluoride, a copolymer of vinylidene fluoride and hexafluoro propylene, a copolymer of vinylidene fluoride and trifluoro ethylene, a copolymer of vinylidene fluoride and tetrafluoro ethylene, polymethyl methacrylate, polyethyl acrylate, polyethyl methacrylate, polybutyl acrylate, polybutyl methacrylate, polyvinyl acetate, polyvinyl alcohol, polyimide, polysulfone, or polyurethane.

The non-aqueous electrolyte solution may be an organic solvent in which lithium salts are dissolved. The organic solvent may include at least one of ethylene carbonate, propylene carbonate, ethyl methyl carbonate, gamma-butyrolactone, ethylene glycol, triglyme, polyethylene oxide, or polyethylene glycol dimethyl ether. The lithium salt may include at least one of lithium perchlorate ($LiClO_4$), lithium triflate ($LiCF_3SO_3$), lithium hexafluoro phosphate ($LiPF_6$), lithium tetrafluoro borate ($LiBF_4$), or lithium trifluoro methane sulfonyl imide ($LiN(CF_3SO_2)_2$).

The inorganic material may include an oxide-based inorganic particle, for example, lithium aluminum titanium phosphate (LATP), lithium aluminum germanium phosphate (LAGP), lithium lanthanum zirconium oxide (LLZO), lithium lanthanum titanium oxide (LLTO), lithium lanthanum niobium oxide (LLNO), lithium lanthanum tallium oxide (LLTO) or lithium barium lanthanum tallium oxide (LBLTO). The inorganic material may be a ceramic solid electrolyte particle. The inorganic particle may have a size of about 500 nm to about 50 mm. The electrolyte paste may also be used in the preparation of the above-described anode paste and a cathode paste to be described later, as well as the formation of the first anode electrolyte layer 16. The first pouch film 10, the first anode current collector 12, the first anode layer 14, and the first anode electrolyte layer 16 may be laminated sequentially according to the above-described manufacturing example. The first anode part 20 may be manufactured in a single processing step using a continuous process, which may be effective for automation, continuous processing, and mass production.

Referring to FIGS. 2A and 2B, a first cathode part 50 may be formed on a second pouch film 30. The first cathode part 50 may include a first cathode current collector 42, a first cathode layer 44, and a first cathode electrolyte layer 46. The second pouch film 30 may be the same as the first pouch film 10, as described in the example of FIG. 1A and FIG. 1B. A top surface of the second pouch film 30 may be subjected to surface treatment, so that the surface energy of the top surface of the second pouch film 30 may increase. The first cathode current collector 42 and a first cathode terminal 48 may be formed on the second pouch film 30. For example, a metal foil may be attached to the top surface of the second pouch film 30 to form the first cathode current collector 42. The metal foil may be attached using a lamination process. For another example, the first cathode current collector 42 may be formed using a deposition process such as sputtering. The first cathode current collector 42 may be formed to have an area that is smaller than that of the second pouch film 30. The first cathode current collector 42 may have a thickness of about 2 μm to about 20 μm. The first cathode current collector 42 may include a metal such as aluminum, nickel, stainless steel (for instance, SUS), titanium, or an alloy thereof.

A cathode terminal 48 may contact the first cathode current collector 42 and protrude from the first cathode current collector 42. The cathode terminal 48 may be formed simultaneously with the first cathode current collector 42, and thus a separate process for forming the cathode terminal 48 may be omitted. The cathode terminal 48 may include the same material and have the same thickness as the first cathode current collector 42. The first cathode layer 44 may be formed by screen printing the cathode paste on the first cathode current collector 42. The first cathode layer 44 may have a cross-sectional area that is equal to or smaller than that of the first cathode current collector 42. The cathode paste may be prepared by mixing a cathode active material, a conducting agent, and an electrolyte paste at a weight ratio of about 6:2:2 to about 9.8:0.1:0.1. The cathode active material may include lithium cobalt oxide (LiCoO$_2$), lithium nickel oxide (LiNiO$_2$), lithium manganese oxide (LiMn$_2$O$_4$), nano-olivine (LiFePO$_4$) which is coated with carbon particles, or any mixtures or solid solutions thereof. Lithium cobalt oxide (LiCoO$_2$), lithium nickel oxide (LiNiO$_2$), and lithium manganese oxide (LiMn$_2$O$_4$) may have a size of about 1 μm to about 100 μm. The conducting agent and the electrolyte paste may include the same materials as the conducting agent and the electrolyte paste which are described in the manufacturing example of FIGS. 1A and 1B. Drying and roll pressing may be performed on the first cathode layer 44. The first cathode layer 44 may include a bottom surface which contacts the first cathode current collector 42, a top surface facing the bottom surface, and a side surface which connects the bottom surface to the top surface. The first cathode layer 44 may have a thickness of about 30 μm to about 200 μm.

The first cathode electrolyte layer 46 may be formed by screen printing an electrolyte paste on the first cathode layer 44. The electrolyte paste may include the same material of the electrolyte paste as described in the example of FIGS. 1A and FIG. 1B that illustrate the formation of the anode electrolyte layer. Accordingly, the first cathode electrolyte layer 46 may be prepared with ease. After the screen printing, the first cathode electrolyte layer 46 may be dried. The first cathode electrolyte layer 46 may be formed to cover the first cathode current collector 42 and the first cathode layer 44. For example, the first cathode electrolyte layer 46 may contact a top surface and a side surface of the first cathode layer 44, and a side surface of the first cathode current collector 42. The first cathode electrolyte layer 46 may be disposed not to be formed on the cathode terminal 48. The first cathode electrolyte layer 46 may be formed to have a thickness of about 5 μm to about 150 μm. Accordingly, the first cathode part 50, including the first cathode current collector 42, the first cathode layer 44, and the first cathode electrolyte layer 46, which are laminated, may be completed. The first cathode part 50 may be manufactured in a single processing step using a continuous process, which may be effective for automation, continuous processing, and mass production.

Referring to FIG. 3, a bipolar part 100, including a second anode part 110, a second cathode part 120, and a polymer film 130, may be manufactured. The polymer film 130 may include a first surface 130a and a second surface 130b opposite to the first surface 130a. The first and second surfaces 130a and 130b of the polymer film 130 may be subjected to surface treatment. The surface treatment may be performed by applying plasma to the polymer film 130 in an atmospheric condition. As a result, a functional group such as a radical may be formed on the first and second surfaces 130a and 130b of the polymer film 130, so that the surface energy of the polymer film 130 may increase. The polymer film 130 may be multi-layered. The polymer film 130 may include an insulative polymer, for example, polyethylene, polypropylene, polyethylene terephthalate, polybutylene terephthalate, nylon, polyimide, or combinations thereof. The polymer film 130 may be a solid, and have a function to support the second cathode part 120 and the second anode part 110. The polymer film 130 may include a through-hole 132 which penetrates the first and second surfaces 130a and 130b. A disk 134 may be provided within the through-hole 132. The disk 134 and the through-hole 132 may be provided in plurality. The disk 134 may include a metal such as copper, aluminum, nickel, stainless steel (for instance, SUS), titanium or an alloy thereof. The disk 134 may have a thickness which is substantially the same as the thickness of the polymer film 130. The disk 134 has a diameter which is substantially the same as the diameter of the through-hole 132, and may thus fill the through-hole 132.

The second anode part 110 and the second cathode part 120 may be provided, respectively, on the first and second surface 130a and 130b of the polymer film 130. The second anode part 110 may be the same as or similar to the first anode part 20, as described with reference to FIGS. 1A and 1B. For example, the second anode part 110 may include a second anode current collector 112, a second anode layer 114, and a second anode electrolyte layer 116, which are successively laminated on the first surface 130a of the polymer film 130. The second anode current collector 112, the second anode layer 114, and the second anode electrolyte layer 116 may be identical, respectively, to the first anode current collector 12, the first anode layer 14, and the first anode electrolyte layer 16, which are illustrated in FIGS. 1A and 1B. The second cathode part 120 may be the same as or similar to the first cathode part 50, as described with reference to FIGS. 2A and 2B. For example, the second cathode part 120 may include a second cathode current collector 122, a second cathode layer 124, and a second cathode electrolyte layer 126, which are successively laminated on the second surface 130b of the polymer film 130. The second cathode current collector 122, the second cathode layer 124, and the second cathode electrolyte layer 126 may be identical, respectively, to the first cathode current collector 42, the first cathode layer 44, and the first cathode electrolyte layer 46, which are illustrated in FIGS. 2A and 2B.

Hereinafter, manufacturing of the second anode part 110 and the second cathode part 120 will be discussed.

The second anode current collector 112 and the second cathode current collector 122 are respectively disposed on the first and second surfaces 130a and 130b of the polymer film 130. The second anode current collector 112 may have a thickness of about 2 μm to about 20 μm, and may have a planar area that is smaller than that of the polymer film 130. The second cathode current collector 122 may have a thickness of about 2 μm to about 20 μm, and may have a planar area that is smaller than that of the polymer film 130. The second anode current collector 112 and the second cathode current collector 122 may be respectively attached to the first surface 130a and the second surface 130b of the polymer film 130 through a lamination process. The second anode current collector 112 and the second cathode current collector 122 may be welded to the disk 134, so that the second anode current collector 112 and the second cathode current collector 122 are electrically connected to the disk 134. The welding process may include an ultrasonic welding, but is not limited thereto. The order through which the second anode current collector 112 and the second cathode current collector 122 are formed may be varied.

The second anode layer 114 may be formed on the second anode current collector 112. The second anode layer 114 may be formed using the same above-described method through which the first anode layer 14 is formed. The second anode electrolyte layer 116 may be formed on the second anode layer 114, and thus cover a top surface of the second anode layer 114, a side surface of the second anode layer 114, and a side surface of the second anode current collector 112. The second anode electrolyte layer 116 may be disposed not to cover a third surface 130c of the polymer film 130. The second anode electrolyte layer 116 may be formed using the same above-described method through which the first anode electrolyte layer 16 is formed.

The second cathode layer 124 may be formed on the second cathode current collector 122. The second cathode layer 124 may be formed using the same above-described method through which the first cathode layer 44 is formed. The second cathode electrolyte layer 126 may be formed on the second cathode layer 124, and thus cover a top surface of the second cathode layer 124, a side surface of the second cathode layer 124, and a side surface of the second cathode current collector 122. The second cathode electrolyte layer 126 may be disposed not to cover a third surface 130c of the polymer film 130. The second cathode electrolyte layer 126 may be formed using the same above-described method through which the first cathode electrolyte layer 46 is formed.

The formation method of the second anode part 110 and the second cathode part 120 is not limited thereto, and a large variety of formation orders may be possible. For example, the second anode current collector 112, the second anode layer 114, the second anode electrolyte layer 116, the second cathode current collector 122, the second cathode layer 124, and the second cathode electrolyte layer 126 may be formed in order. For another example, the second cathode current collector 122, the second cathode layer 124, the second cathode electrolyte layer 126, the second anode current collector 112, the second anode layer 114, and the second anode electrolyte layer 116 may be formed in order.

Referring to FIGS. 4A and 4B, the first cathode part 50, the first anode part 20, and the bipolar part 100 may be connected. The first anode part 20 may be formed using the method as described in the examples of FIGS. 1A and 1B. The first cathode part 50 may be formed using the method as described in the examples of FIGS. 2A and 2B. The bipolar part 100 may be formed using the method as described in the examples of FIG. 3.

The bipolar part 100 may be disposed on the first anode part 20 such that the second cathode part 120 contacts the first anode part 20. The first pouch film 10 of the first anode part 20 may be spaced apart from the bipolar part 100. The second cathode electrolyte layer 126 of the bipolar part 100 may face and contact the first anode electrolyte layer 16 of the first anode part 20. The second cathode electrolyte layer 126 may include the same material as the first anode electrolyte layer 16, and thus the contact resistance between the electrolyte layers may be low. Accordingly, the electrical properties of a lithium battery may be improved. According to an embodiment, the first anode electrolyte layer 16 and the second cathode electrolyte layer 126 may be disposed between the first anode layer 14 and the second cathode layer 124, so that an electrical short may be prevented from occurring between the first anode layer 14 and the second cathode layer 124.

The first cathode part 50 may be disposed on the bipolar part 100 such that the first cathode part 50 contacts the second anode part 110. As illustrated in FIG. 4B, the second pouch film 30 of the first cathode part 50 may be spaced apart from the bipolar part 100. The second anode electrolyte layer 116 of the bipolar part 100 may face and contact the first cathode electrolyte layer 46 of the first cathode part 50. The second anode electrolyte 116 layer may include the same material as the first cathode electrolyte layer 46, and thus the contact resistance between the second anode electrolyte layer 116 and the first cathode electrolyte layer 46 may be low. Accordingly, the electrical properties of a lithium battery may be improved. The second anode electrolyte layer 116 and the first cathode electrolyte layer 46 may be disposed between the second anode layer 114 and the first cathode layer 44, so that an electrical short may be prevented from occurring between the second anode layer 114 and the first cathode layer 44.

The order of lamination of the first anode part 20, the bipolar part 100, and the first cathode part 50 is not limited thereto and a large variety of orders may be possible. For example, the bipolar part 100 may be formed on the first cathode part 50, and the first anode part 20 may be formed on the bipolar part 100.

The first anode part 20, the bipolar part 100, and the first cathode part 50 may be interconnected through thermal bonding. Through the thermal bonding, the first anode electrolyte layer 16 may be connected to the second cathode electrolyte layer 126, and the second anode electrolyte layer 116 may be connected to the first cathode electrolyte layer 46. The thermal bonding may be performed in a vacuum condition at a temperature of about 30° C. to about 160° C., and preferably about 50° C. to about 130° C. When the thermal bonding is performed at a temperature below 30° C., the first anode part 20, the bipolar part 100, and the first cathode part 50 may be connected poorly. When the thermal bonding is performed at a temperature above 160° C., the first anode part 20, the bipolar part 100, or the first cathode part 50 may be damaged by heat. According to an embodiment, the first anode part 20, the bipolar part 100, and the first cathode part 50 are prepared and then interconnected simultaneously through thermal bonding, and thus a lithium battery may be easily manufactured.

The first anode part 20 and the second cathode part 120 may form a first unit cell UB1. The second anode part 110 and the first cathode part 50 may form a second unit cell UB2. According to an embodiment, the second unit cell UB2 and the first unit cell UB1 may be connected in series through the disk 134. The second unit cell UB2 may have the same structure and include the same material, and thus realize the same electrical performance (for example, capacity and voltage) as the first unit cell UB1. A capacity of a lithium battery may be equal to a sum of the capacities of the first and second unit cells UB1 and UB2. A voltage of a lithium battery may be equal to a sum of the voltages of the first and second unit cells UB1 and UB2. In accordance with a method of manufacturing a lithium battery according to an embodiment of the inventive concept, a lithium battery having an increased capacity may be easily manufactured. The disk 134 is disposed within a lithium battery, and thus the unit cells may be electrically connected with ease. An additional pouch film (not shown) is not disposed between the first unit cell UB1 and the second unit cell UB2, and thus a lithium battery may become smaller. The electrolyte layers are a solid, and the second anode electrolyte layer 116 and the second cathode electrolyte layer 126 may be disposed not to cover a sidewall of the polymer film 130. Accordingly, the first unit cell UB1 and the second unit cell UB2 may be connected in series.

A third pouch film 200 may be provided on a sidewall of the first anode part 20, a sidewall of the bipolar part 100, and a sidewall of the first cathode part 50. The third pouch film 200 may include the same material as the first and second pouch films 10 and 30. The third pouch film 200 may be connected to the first and second pouch films 10 and 30. The first anode part 20, the bipolar part 100, and the first cathode part 50 may be sealed by the first to third pouch films 10, 30, and 200. Accordingly, the anode part 20, the bipolar part 100, and the first cathode part 50 may be prevented from being damaged by external air and moisture. A lithium battery may have a long lifetime and good safety characteristics.

According to an embodiment, the first cathode part 50 is disposed on the second pouch film 30 and the first anode part 20 is disposed on the first pouch film 10, and thus a process of attaching the pouch films 10 and 30 may be omitted.

Figure 5:
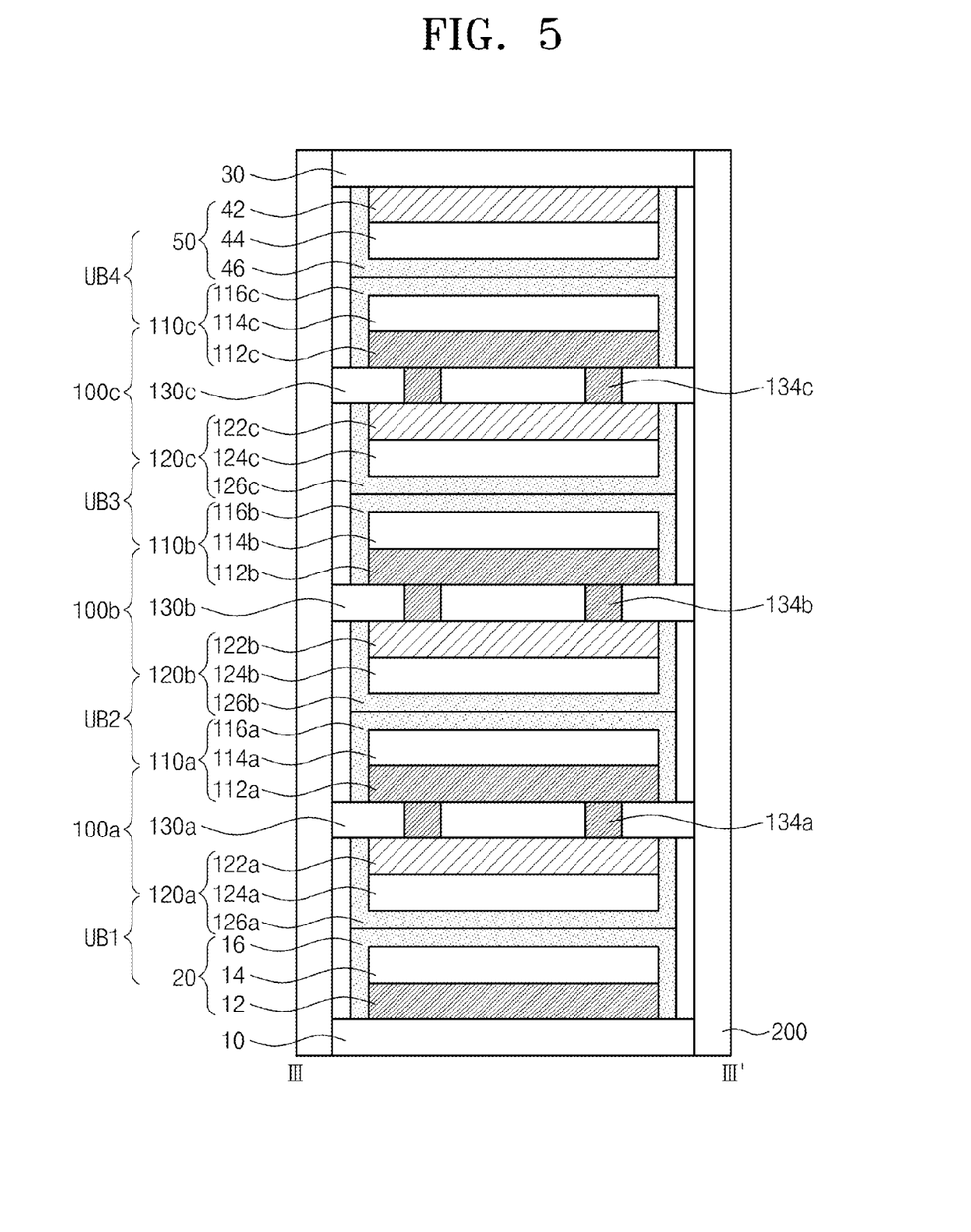
FIG. 5 is a cross-sectional view taken along line III-III' of FIG. 4A, illustrating a lithium battery according to another embodiment of the inventive concept.

FIG. 5 is a cross-sectional view taken along line III-III' of FIG. 4A, illustrating a lithium battery according to another embodiment of the inventive concept.

Any repetition of the above detailed description will hereinafter be omitted.

Referring to FIGS. 5 and 4A, a lithium battery may be manufactured by connecting in series the first cathode part 50, a plurality of bipolar parts 100a, 100b, and 100c, and the first anode part 20. The first anode part 20 may be manufactured using the method as described in the example of FIGS. 1A and 1B. The first cathode part 50 may be manufactured by the method as described in the examples of FIGS. 2A and 2B. The bipolar part 100 may include the first to third bipolar parts 100a, 100b, and 100c. Each of the first to third bipolar parts 100a, 100b and 100c may be manufactured using the method as described in the example of the bipolar part 100 of FIGS. 3A and 3B. Accordingly, the first to third bipolar parts 100a, 100b, and 100c may have the same structure and include the same material. The first cathode part 50, the first to third bipolar parts 100a, 100b, and 100c, and the second anode part 110 may be connected in the same manner as described in FIGS. 4A and 4B. A lithium battery may be formed by laminating the plurality of bipolar parts 100a, 100b, and 100c and the first cathode part 50 on the first anode part 20. The first bipolar part 100a may be disposed on the first anode part 20, so that the second cathode part 120a of the first bipolar part 100a contacts the first anode part 20. Subsequently, the second bipolar part 100b may be disposed on the second anode part 110a such that the second cathode part 120b of the second bipolar part 100b contacts the second anode part 110a of the first bipolar part 100a. The third bipolar part 100c may be disposed on the second bipolar part 100b such that the second anode part 120b of the second bipolar part 100b contacts the second cathode part 120c of the third bipolar part 100c. The first cathode part 50 may be disposed on the third bipolar part 100c, so that the first cathode part 50 contacts the second anode part 110c. The first anode part 20, the first to third bipolar parts 100a, 100b, and 100c, and the first cathode part 50 may be interconnected through thermal bonding. The second anode electrolyte layers 116a, 116b, and 116c and the second cathode electrolyte layers 126a, 126b, and 126c of each of the bipolar parts 100a, 100b, and 100c may be a solid, and may be disposed not to cover a sidewall of the polymer films 130a, 130b, and 130c.

According to an embodiment, a lithium battery may include the first to fourth unit cells UB1 to UB4. The first anode part 20, and the second cathode part 120a of the first bipolar part 100a may form the first unit cell UB1. The second anode part 110b of the first bipolar part 100a, and the second cathode part 120b of the second bipolar part 100b may form the second unit cell UB2. The second anode part 110b of the second bipolar part 100b, and the second cathode part 120c of the third bipolar part 100c may form the third unit cell UB3. The second anode part 120c of the third bipolar part 100c, and the first cathode part 50 may form the fourth unit cell UB4. A plurality of bipolar parts 100a, 100b, and 100c may be provided, and therefore the polymer films 130 may be respectively disposed between the unit cells. The unit cells UB1 to UB4 may be connected in series through the disks 134a, 134b, and 134c which are disposed within the polymer films 130a, 130b, and 130c. The first to fourth unit cells UB1 to UB4 may have the same electrical properties (for example, capacity and voltage). Since the first to fourth unit cells UB1 to UB4 are connected in series, a voltage of a lithium battery is equal to a sum of the voltages of the first to fourth unit cells UB1 to UB4. For example, a voltage of a lithium battery may be equal to four times the voltage of the first unit cell UB1. A capacity of a lithium battery may be equal to the capacity of the first unit cell UB1. According to an embodiment, a voltage of a lithium battery may be controlled by adjusting number of the bipolar parts 100a, 100b and 100c.

The pouch films 10, 30 and 200 may protect the unit cells from the external environment. The anode terminal 18 may be spaced apart laterally from the cathode terminal 48.

Hereinafter, a method of manufacturing a lithium battery according to an embodiment of the inventive concept and evaluation results of the lithium battery are described in detail with reference to Experimental Examples.

Manufacturing of Lithium Battery

Experimental Example 1

(Manufacturing of Electrolyte Paste)

A polymer matrix is prepared by dissolving ethyl cellulose in N-methyl pyrrolidone (NMP), and then dissolving a copolymer of vinylidene fluoride and hexafluoro propylene. Ethyl cellulose and the copolymer have a weight ratio of about 30:70. Lithium hexafluoro phosphate ($LiPF_6$) is dissolved in an organic solvent to prepare a non-aqueous electrolyte solution having a concentration of about 1 mol/L. The organic solvent is produced by mixing ethylene carbonate (EC), propylene carbonate (PC), and ethyl methyl carbonate (EMC) at a weight ratio of about 1.5:1:1.5. The non-aqueous electrolyte solution and lithium aluminum titanium phosphate (LATP), in an amount of 300 wt % and 50 wt % of the polymer matrix respectively, are sequentially added to the polymer matrix. Thereafter, stirring is performed.

(Manufacturing of First Anode Part)

Hereinafter, a method of manufacturing a first anode part is described with reference to FIGS. 1A and 1B.

A nylon layer, an aluminum foil, and a cast polypropylene layer are laminated to form a first pouch film 10. The first pouch film 10 is subjected to surface treatment using a corona discharger under atmospheric conditions until the surface energy of the first pouch film 10 is 60 dyne/cm or more.

A copper foil having a thickness of about 8 nm is laminated on the first pouch film 10 to form a first anode current collector 12 on the first pouch film 10. The lamination is performed at a temperature of about 130° C., after a hot melt adhesive film is inserted between the first pouch film 10 and the copper foil. An anode terminal 18 is formed on the first pouch film 10 and connected to the copper foil.

An anode paste, which is prepared by mixing electrolyte paste, natural graphite, and acetylene black at about 10 wt %, 85 wt % and 5 wt % respectively, is used. The electrolyte paste is prepared as described above. The anode paste is coated with a thickness of about 65 nm on the first anode current collector 12 to form a first anode layer 14. Subsequently, the electrolyte paste is coated on the first anode layer 14 to form a first electrolyte layer 16.

(Manufacturing of First Cathode Part)

Hereinafter, a method of manufacturing a first cathode part is described with reference to FIGS. 2A and 2B.

As similar to the first anode part 20, a first cathode part 50 is formed on a second pouch film 30. However, an aluminum foil having a thickness of about 10 μm, a width of about 120 mm, and a height of about 87 mm is used as a first cathode current collector 42. Electrolyte paste, lithium cobalt oxide ($LiCoO_2$), and acetylene black are mixed at about 10 wt %, 85 wt %, and 5 wt % respectively to prepare a cathode paste. The electrolyte paste is prepared as described above. The cathode paste is coated with a thickness of about 100 nm on the copper current collector to form a first cathode layer 44. The electrolyte paste is coated directly on the first cathode layer 44 to form a first cathode electrolyte layer 46

(Manufacturing of Bipolar Part)

Hereinafter, a method of manufacturing a bipolar part is described with reference to FIGS. 3A and 3B.

Four through-holes 132 are formed on a cast polypropylene (c-PP) film having a thickness of about 150 nm using a round drill. Each of the through-holes 132 has a diameter of about 5 mm. A copper disk 134 having a diameter of about 4 mm and a thickness of about 15 nm is inserted into each of the through-holes 132. A copper foil is positioned on a first surface 130a of the c-PP film, and an aluminum foil is positioned on a second surface 130b of the c-PP film. The copper foil and the c-PP film are laminated, and also the aluminum foil and the c-PP film are laminated. The copper disk 134, the copper foil, the copper disk 134, and the aluminum foil are welded using an ultrasonic welder. A second cathode layer 124 and a second cathode electrolyte layer 126 are formed on an aluminum film in the same manner as the first anode layer 14 and the first anode electrolyte layer 16. A second anode layer 114 and a second anode electrolyte layer 116 are formed on the copper film in the same manner as the first anode layer 14 and the first anode electrolyte layer 16.

(Manufacturing of Lithium Battery)

Hereinafter, a method of manufacturing a lithium battery is described with reference to FIGS. 4A and 4B.

The first anode part 20, the bipolar part 100, and the first cathode part 50 are laminated. The first anode electrolyte layer 16 of the first anode part 20 is disposed to face the second cathode electrolyte layer 126 of the bipolar part 100. The first cathode electrolyte layer 46 of the first cathode part 50 is disposed to face the second anode electrolyte layer 116 of the bipolar part 100. The first anode part 20, the bipolar part 100, and the first cathode part 50 are thermally bonded and laminated, at a temperature of about 130° C.

Experimental Example 2

A lithium battery may be manufactured using the same method as used in Experimental Example 1. However, electrolyte paste, olivine ($LiFePO_4$), and acetylene black are mixed at a ratio of about 10 wt %, 85 wt %, and 5 wt % respectively to produce the cathode paste.

Comparative Example 1

A lithium battery was manufactured using the same method as used in Experimental Example 1. However, a bipolar part 100 was manufactured using a nickel foil instead of a c-PP film. The nickel foil does not include a through-hole 132, and a copper disk 134 is omitted. A first cathode part 50, a bipolar part 100, and a first anode part 20 are connected in series through an external wire.

Comparative Example 2

A lithium battery was manufactured using the same method as used in Comparative Example 1. However, electrolyte paste, olivine ($LiFePO_4$), and acetylene black were mixed at a ratio of about 10 wt %, 85 wt %, and 5 wt % respectively to produce the cathode paste.

Evaluation of Lithium Battery Performance

Figure 6:
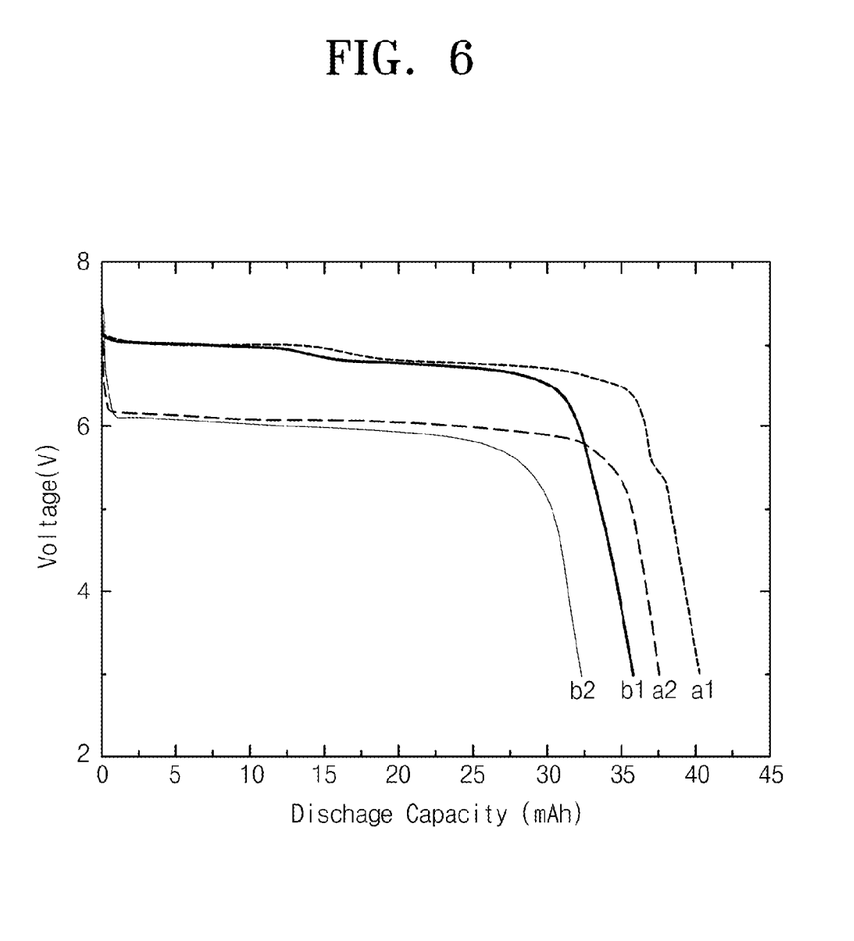
FIG. 6 is a graph showing evaluation results of discharge characteristics of the lithium batteries according to Experimental Examples and Comparative Examples.

FIG. 6 is a graph showing evaluation results of discharge characteristics of the lithium batteries according to Experimental Examples and Comparative Examples. Discharge characteristics were evaluated by discharging the lithium batteries and measuring the discharge capacity (horizontal axis) versus the voltage (vertical axis). Hereinafter, description is given with reference to FIGS. 4A and 4B.

Referring to FIG. 6, Experimental Example 1 (a1) has a larger discharge capacity than Comparative Example 1 (b1) and Comparative Example 2 (b2), and Experimental Example 2 (a2) has a larger discharge capacity than Comparative Example 2 (b2). The unit cells of the Comparative Examples (b1 and b2) are connected in series through an external wire. The unit cells of a lithium battery of the Experimental Examples (a1 and a2) are connected in series through a disk 134 provided within the lithium battery. Since the disk 134 is firmly connected to a second cathode current collector 122 and a second anode current collector 112 through vacuum thermal bonding, the second cathode current collector 122 and the polymer film 130, and the second anode current collector 112 and the polymer film 130 may be strongly connected. A physical void may be minimized between the second cathode current collector 122 and the polymer film 130, and between the second anode current collector 112 and the polymer film 130. Thus, an internal resistance between the first unit cell UB1 and the second unit cell UB2 may be low.

Figure 7:
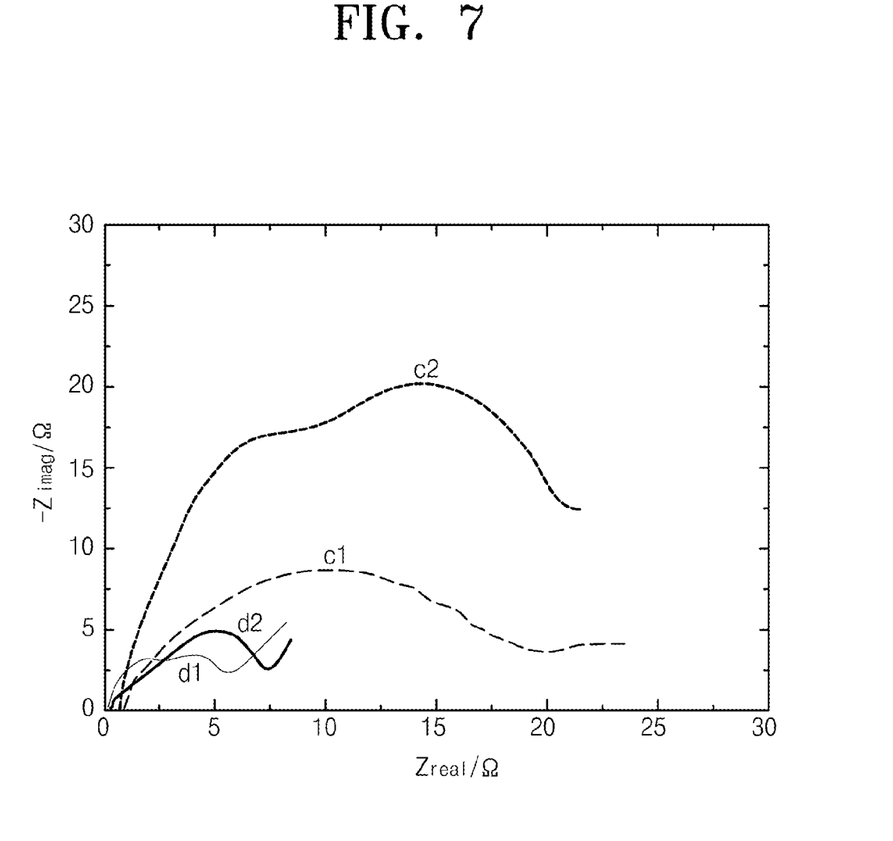
FIG. 7 is a graph showing evaluation results of impedance characteristics of the lithium batteries according to Experimental Examples and Comparative Examples.

Accordingly, the Experimental Examples (a1 and a2) may have a high discharge capacity. The cathode electrolyte layers and the anode electrolyte layers are formed through a screen printing process, and thus may contact the cathode layers and the anode layers. Accordingly, the voltage drop characteristic of a lithium battery may be improved due to a low interfacial resistance between the cathode electrolyte layers and the cathode layers, and between the anode electrolyte layers and the anode layers FIG. 7 is a graph showing evaluation results of impedance characteristics of the lithium batteries according to Experimental Examples and Comparative Examples. Hereinafter, a description is given with reference to FIGS. 4A and 4B.

Referring to FIG. 7, Experimental Example 1 (d1) has a lower internal resistance than Comparative Example 1 (c1), and Experimental Example 2 (d2) has a lower internal resistance than Comparative Example 2 (c2). In the lithium batteries of the Comparative Examples (c1 and c2), a polymer film 130 is omitted which allows a small leakage current to flow between the first unit cell UB1 and the second unit cell UB2, and thus the impedance is low. In the Experimental Examples, a polymer film 130 may be provided between the first unit cell UB1 and the second unit cell UB2. The polymer film 130 may include an insulating material, and the electrolyte layers of the bipolar part 100 may be disposed not to cover the sidewalls of the polymer film 130. Accordingly, the second anode electrolyte layer 116 of the first unit cell UB1 may be electrically insulated from the second cathode electrolyte layer 126 of the second unit cell UB2. Accordingly, a leakage current may be prevented from flowing between the first and second unit cells UB1 and UB2 of a lithium battery. In the lithium batteries of the Experimental Examples (d1 and d2), the electrolyte may be coated directly on the electrode, all of the unit cells may be thermally bonded during stacking of cells, and thus physical contact within the cells and between cells may be maximized. Physical voids at each of the interfaces may also be minimized, thus strengthening the adhesion.

Figure 8:
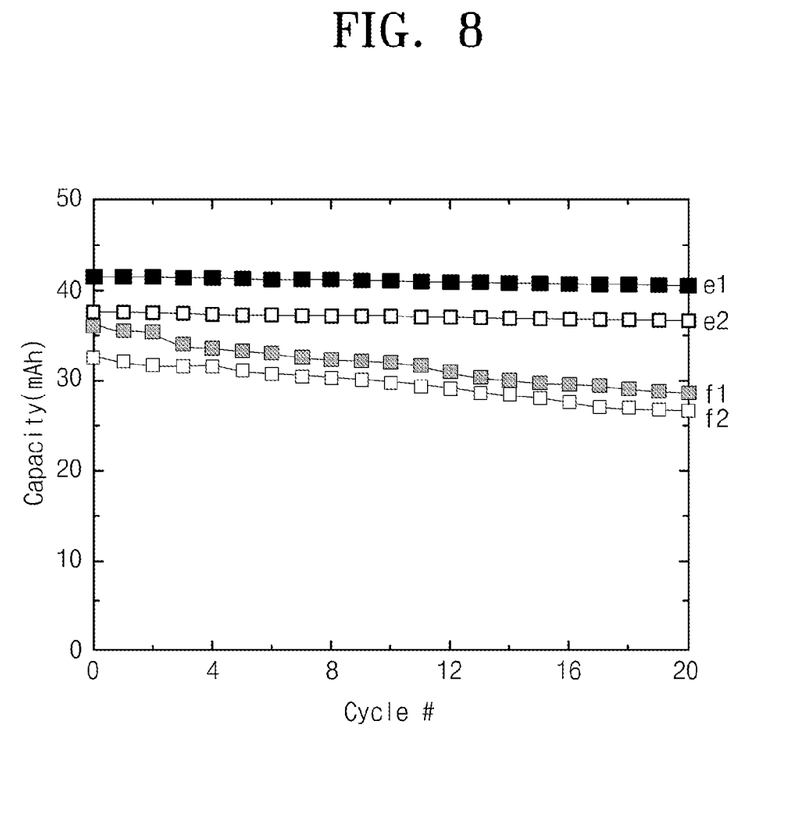
FIG. 8 is a graph showing evaluation results of lifetime characteristics of the lithium batteries according to Experimental Examples and Comparative Examples.

FIG. 8 is a graph showing evaluation results of lifetime characteristics of the lithium batteries according to Experimental Examples and Comparative Examples. The horizontal axis indicates number of cycles and the vertical axis indicates capacity. Hereinafter, a description is given with reference to FIGS. 4A and 4B.

Referring to FIG. 8, for an identical cycle, Experimental Example 1 (e1) has a higher capacity than Comparative Example 1 (f1), and Experimental Example 2 (e2) has a higher capacity than Comparative Example 2 (f2). As described above with reference to FIGS. 6 and 7, the Experimental Examples (e1 and e2) have a lower internal resistance and improved voltage drop characteristics compared to the Comparative Examples (f1 and f2). As number of cycles increases, the capacity of the Experimental Examples (e1 and e2) is relatively stable, whereas the capacity of the Comparative Examples (f1 and f2) may be observed to decline. Accordingly, the Experimental Examples (e1 and e2) show superior lifetime characteristics compared to the Comparative Examples (f1 and f2). As described above, the Experimental Examples (e1 and e2) are connected in series through the disk 134, and thus the internal resistance between the unit cells UB1 and UB2, may be low. The Experimental Examples (e1 and e2) may have improved voltage drop characteristics. Accordingly, the lithium battery is shown to have a long lifetime and stability.

According to embodiments of the inventive concept, a lithium battery includes a first unit cell and a second unit cell connected in series through a disk. Accordingly, the lithium battery has a high voltage when being operated. Herein, a voltage of the lithium battery may be controlled by adjusting number of unit cells.

According to embodiments, a lithium battery may be manufactured by connecting a first cathode part, bipolar parts, and a second anode part. The first cathode part, the bipolar parts, and the second anode part may be manufactured through a continuous process, which may be effective for continuous processing, automation, and mass production. The first cathode part, the bipolar parts, and the second anode part may be connected through thermal bonding, and thus a lithium battery may have a low resistance, an improved discharge characteristic, and a long lifetime. An insulative polymer film may be connected to a second anode current collector and a second cathode current collector through thermal bonding, and thus the insulative polymer film may be well connected to the second anode current collector and the second cathode current collector.

While the inventive concept has been described in detail with reference to exemplary embodiments thereof, it should be understood that the inventive concept is not limited by the above embodiments, and it is possible for a person of ordinary skill in the art to make various modifications or changes without departing from the technical spirit and scope of the inventive concept.

What is claimed is:

1. A lithium battery, comprising:
   a first pouch film;
   a first anode part on the first pouch film;
   a second cathode part on the first anode part;
   a polymer insulating film on the second cathode part, the polymer insulating film including a disk which is configured to penetrate the polymer insulating film;
   a second anode part on the polymer insulating film;
   a first cathode part on the second anode part; and
   a second pouch film on the first cathode part;
   wherein the second cathode part is electrically connected to the second anode part through the disk.

2. The lithium battery of claim 1, wherein:
   the polymer insulating film comprises a first surface and a second surface opposite to the first surface, the first surface facing the first pouch film;
   the first anode part comprises a first anode current collector, a first anode layer, and a first anode electrolyte layer which are laminated on the first pouch film;
   the second cathode part comprises a second cathode current collector, a second cathode layer, and a second cathode electrolyte layer which are laminated on the first surface of the polymer insulating film;
   the second anode part comprises a second anode current collector, a second anode layer, and a second anode electrolyte layer which are laminated on the second surface of the polymer insulating film; and
   the first cathode part comprises a first cathode current collector, a first cathode layer, and a first cathode electrolyte layer which are laminated on the second pouch film.

3. The lithium battery of claim 2, wherein:
   the first anode electrolyte layer faces and contacts the second cathode electrolyte layer; and
   the second anode electrolyte layer faces and contacts the first cathode electrolyte layer.

4. The lithium battery of claim 2, wherein the first anode electrolyte layer includes the same material as the first cathode electrolyte layer, the second anode electrolyte layer and the second cathode electrolyte layer.

5. The lithium battery of claim 2, wherein:
   the polymer insulating film comprises a third surface configured to connect the first surface to the second surface; and
   the third surface of the polymer film is exposed by the second cathode electrolyte layer and the second anode electrolyte layer.

6. The lithium battery of claim 2, wherein:
   each of the second cathode part, the second anode part and the polymer insulating film is provided in plurality, in which the second cathode electrolyte layer of each of the second cathode parts faces and contacts the second anode electrolyte layer of each of the second anode parts that are adjacent to the second cathode parts.

7. The lithium battery of claim 1, wherein the first anode part and the second cathode part form a first unit cell, and the second anode part and the first cathode part form a second unit cell, the first unit cell being connected to the second unit cell in series through the disk.

8. The lithium battery of claim 1, wherein the first unit cell has the same voltage and capacity as the second unit cell.

9. The lithium battery of claim 1, wherein:
   each of the second cathode part, the second anode part and the polymer insulating film is provided in plurality, number of the second cathode parts being equal to number of the second anode parts and number of the polymer insulating films; and
   each of the polymer insulating films is disposed between one of the second cathode parts and one of the second anode parts.

10. The lithium battery of claim 1, comprising:
    an anode terminal connected, on the first pouch film, to the first anode current collector, and configured to protrude laterally and horizontally from the first anode current collector; and a cathode terminal connected, on the second pouch film, to the first cathode current collector, and configured to protrude laterally and horizontally from the first cathode current collector.

11. A method for manufacturing a lithium battery, the method comprising:
   forming a first anode part on a first pouch film, the first anode part including a first anode current collector, a first anode layer and a first anode electrolyte layer which are laminated sequentially on the first pouch film;
   forming a first cathode part on a second pouch film, the first cathode part including a first cathode current collector, a first cathode layer and a first cathode electrolyte layer which are laminated on the second pouch film;
   providing a bipolar part, the bipolar part including a polymer insulating film, one or more disks configured to penetrate the polymer insulating film, a second cathode part on a first surface of the polymer insulating film, and a second anode part on a second surface of the polymer insulating film; and
   connecting the first cathode part and the first anode part by providing the bipolar part therebetween;
   wherein the first cathode part contacts the second anode part, and the first anode part contacts the second cathode part.

12. The method of claim 11, wherein the second cathode part is connected to the second anode part in series through the disk.

13. The method of claim 11, wherein the providing of the bipolar part comprises:
   forming the second cathode part by laminating, on the first surface of the polymer insulating film, a second cathode current collector, a second cathode layer, and a second cathode electrolyte layer; and
   forming the second anode part by laminating, on the second surface of the polymer insulating film, a second anode current collector, a second anode layer, and a second anode electrolyte layer.

14. The method of claim 13, wherein the second cathode current collector and the second anode current collector are connected to the disk through ultrasonic bonding.

15. The method according to claim 13, wherein the connecting of the first cathode part, the second anode part, and the bipolar part comprises thermally bonding the first cathode part, the second anode part, and the bipolar part at a temperature in the range of about 100° C. to about 160° C.

16. The method according to claim 13, wherein:
   the polymer insulating film has a third surface configured to connect the first surface to the second surface, and
   the third surface is exposed by the second cathode electrolyte layer and the second anode electrolyte layer.

17. The method according to claim 13, wherein:
   the first anode electrolyte layer faces and contacts the second cathode electrolyte layer, and
   the second anode electrolyte layer faces and contacts the first cathode electrolyte layer.

18. The method of claim 13, wherein the first anode electrolyte layer, the first cathode electrolyte layer, the second anode electrolyte layer, and the second cathode electrolyte layer include the same material.

19. The method of claim 13, wherein:
   the bipolar part is provided in plurality, and
   the second cathode electrolyte layer of one of the bipolar parts contacts the second anode electrolyte layer of another of the bipolar parts that is adjacent to the one of the bipolar parts.

* * * * *